May 23, 1933.  A. JOHNSON  1,910,290
ROAD DRAG
Filed June 22, 1932
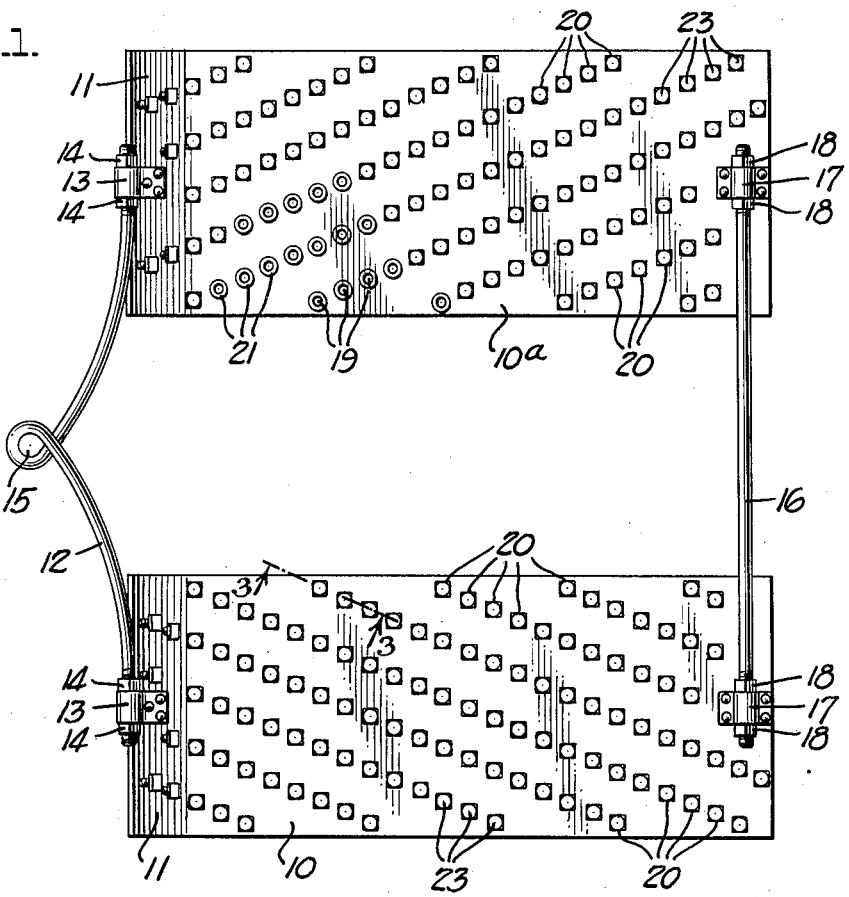
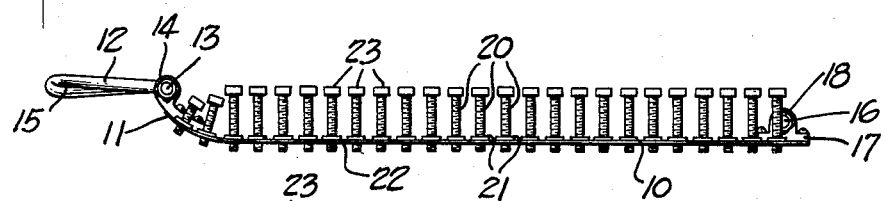
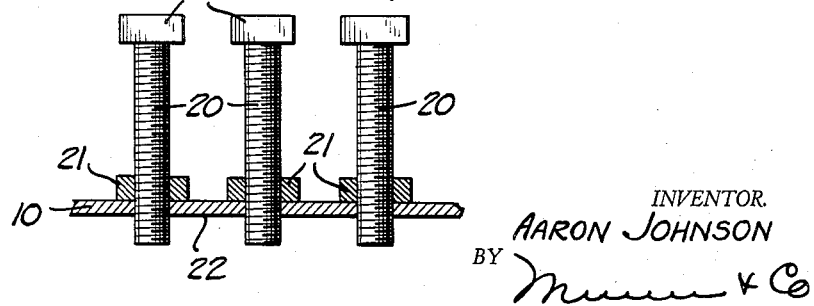
INVENTOR.
AARON JOHNSON
BY
ATTORNEYS.

UNITED STATES PATENT OFFICE

AARON JOHNSON, OF SALOME, ARIZONA

ROAD DRAG

Application filed June 22, 1932. Serial No. 618,753.

This invention relates to and has for a purpose the provision of a road drag structurally characterized by scarifying or rasping elements which project from the tread surface of the drag and are operative to remove the high spots on rough or corrugated roads so as to smooth or level the road surface.

It is a further purpose of this invention to provide a road drag in which the scarifying or rasping elements are preferably in the form of screws or bolts threadedly mounted on the drag for adjustment to project from its tread surface the required distance, the mounting of the elements enabling them to be readily adjusted when they wear away or become dulled, thus greatly prolonging the useful life of the elements as well as permitting replacement thereof with the utmost ease and dispatch.

Only one form of road drag embodying this invention will now be described, following which the novel features of the invention will be pointed out in the claim.

In the accompanying drawing,

Figure 1 is a view showing in plan one form of road drag embodying this invention;

Figure 2 is a view of the road drag in side elevation;

Figure 3 is an enlarged fragmentary sectional view taken on the line 3—3 of Figure 1.

Referring specifically to the drawing, wherein similar reference characters designate similar parts in each of the several views, this invention, in its present embodiment, comprises two flat plates 10 and 10a of slightly flexible steel or other material which are rectangular in shape with their forward ends curved upwardly as indicated at 11, and tied together in definite spaced relation by a draw bar 12. The draw bar extends through openings in brackets 13 fixed to the plates, and is threaded at its ends to receive nuts 14 which co-act with the brackets to rigidly secure the draw bar thereto. The draw bar is provided centrally with an eye 15 to which any desired draft apparatus can be hitched to draw the drag over a road.

The rear ends of the plates 10 and 10a are tied together to maintain the plates in parallel spaced relation, by a tie bar 16 extending through brackets 17 fixed to the plates, the ends of the tie bars being threaded to receive nuts 18 for suitably securing the tie bar to the brackets.

The plates are provided at intervals with threaded openings 19 to threadedly receive scarifying or rasping elements in the form of headed screws or bolts 20. Due to the comparative thinness of the plates, the openings 19 continue through washers or collars 21 which are welded to the upper surface of the plates and provide sufficient threads for the screws to prevent stripping, as will be understood.

The openings 19 are arranged so that the screws 20 are in rows extending obliquely of the length of the plates, with the obliquity of the rows of screws on one plate being reversed or opposite to the rows on the other plate so as to avoid any tendency of the drag to shift to one side or the other as it is drawn forwardly over a road.

The screws 20 project from the under or tread surfaces 22 of the plates a distance most effective for breaking up or cutting through the high spots of a rough or corrugated road; and the threaded mounting of the screws in the plates enables the screws to be readily adjusted to compensate for wear. It will be manifest that the threads of the screws function as cutting edges to very effectively cut through the road surface during operation of the drag, and that as the forward portions of the screws wear away, the screws can be partially rotated to bring new portions of the threads into position for use. It is to be understood that the screws are tightly fitted in the threads of the openings 19 so as to require that a wrench be used on the screw heads 23 in order to turn the screws, thus insuring that the screws will remain in adjusted position.

Furthermore, it will be clear that, as the screws scarify the high spots of a corrugated road, the plates will drag the thus broken up material into the low spots of the road surface, thereby effectively smoothing out or leveling the road surface in one operation.

What is claimed is:

A road drag comprising a pair of flexible metallic plates; brackets secured to the plates at the front and rear portions thereof and having openings therethrough; a draw bar extending through the openings of those brackets at the front of the plates; nuts threaded on the draw bar and coacting with the respective brackets to rigidly connect the front ends of the plates in spaced relation; a tie bar extending through the openings of those brackets at the rear of the plates; nuts threaded on the tie bar and coacting with the respective brackets to rigidly connect the rear ends of the plates in spaced relation; and scarifying elements projecting from the tread surfaces of the plates.

AARON JOHNSON.